US012477675B2

(12) United States Patent
Cao

(10) Patent No.: US 12,477,675 B2
(45) Date of Patent: Nov. 18, 2025

(54) FLEXIBLE DISPLAY PANEL AND ELECTRONIC DEVICE

(71) Applicant: Wuhan China Star Optoelectronics Semiconductor Display Technology Co., Ltd., Hubei (CN)

(72) Inventor: Huan Cao, Hubei (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 17/623,635

(22) PCT Filed: Dec. 20, 2021

(86) PCT No.: PCT/CN2021/139605
§ 371 (c)(1),
(2) Date: Jun. 22, 2023

(87) PCT Pub. No.: WO2023/108673
PCT Pub. Date: Jun. 22, 2023

(65) Prior Publication Data
US 2024/0121905 A1    Apr. 11, 2024

(30) Foreign Application Priority Data
Dec. 13, 2021 (CN) .......................... 202111523161.5

(51) Int. Cl.
H05K 5/00      (2025.01)
F16C 11/04     (2006.01)
H05K 5/02      (2006.01)

(52) U.S. Cl.
CPC ............ H05K 5/0226 (2013.01); F16C 11/04 (2013.01)

(58) Field of Classification Search
None
See application file for complete search history.

(56) References Cited

U.S. PATENT DOCUMENTS

| 11,644,874 | B2* | 5/2023  | Kuramochi | G06F 1/1641 |
|            |     |         |           | 361/679.27  |
| 11,775,029 | B2* | 10/2023 | Yuan      | G06F 1/181  |
|            |     |         |           | 361/679.27  |
| 11,825,620 | B2* | 11/2023 | Zhao      | H05K 5/0226 |
| 11,924,987 | B2* | 3/2024  | Lee       | G06F 1/16   |
| 11,994,161 | B2* | 5/2024  | Liu       | H05K 5/0226 |

(Continued)

FOREIGN PATENT DOCUMENTS

CN    110138916    8/2019
CN    110701176    1/2020

(Continued)

Primary Examiner — Imani N Hayman
Assistant Examiner — Rashen E Morrison

(57) ABSTRACT

The present application provides a flexible display panel and an electronic device. The flexible display panel includes a housing, a hinge, and a flexible display panel body. The hinge includes a fixing bracket, a supporting mechanism, and a rotating mechanism. The fixing bracket includes a first fixing bracket and a second fixing bracket. The supporting mechanism includes a first supporting portion and a second supporting portion. The rotating mechanism includes a first rotating shaft, a second rotating shaft, a first connecting member, and a second connecting member.

18 Claims, 6 Drawing Sheets

(56) References Cited

U.S. PATENT DOCUMENTS

| | | | |
|---|---|---|---|
| 2020/0233466 A1 | 7/2020 | Sanchez et al. | |
| 2021/0034116 A1 | 2/2021 | Torres et al. | |
| 2021/0368032 A1* | 11/2021 | Liao | G06F 1/1681 |
| 2023/0403347 A1* | 12/2023 | Liu | H04M 1/022 |
| 2024/0084844 A1* | 3/2024 | Yan | H04M 1/022 |
| 2024/0427384 A1* | 12/2024 | Feng | G06F 1/16 |

FOREIGN PATENT DOCUMENTS

| | | |
|---|---|---|
| CN | 112648279 | 4/2021 |
| CN | 112762090 | 5/2021 |
| CN | 113202857 | 8/2021 |
| CN | 113404770 | 9/2021 |
| CN | 113534891 | 10/2021 |
| CN | 113542456 | 10/2021 |

\* cited by examiner

FLEXIBLE DISPLAY PANEL AND ELECTRONIC DEVICE

RELATED APPLICATIONS

This application is a National Phase of PCT Patent Application No. PCT/CN2021/139605 having International filing date of Dec. 20, 2021, which claims the benefit of priority of Chinese Patent Application No. 202111523161.5 filed on Dec. 13, 2021. The contents of the above applications are all incorporated by reference as if fully set forth herein in their entirety.

FIELD AND BACKGROUND OF THE INVENTION

The present application relates to a field of display technology, and in particular to a flexible display panel and an electronic device.

With continuous development of display technology, various displays having different characteristics have emerged in order to meet different use requirements. Development trend of intelligent, portable and flexible display technology is one of the main development directions of electronic devices. The most outstanding advantage of the flexible display technology compared with the conventional panel display technology lies in breaking through an inherent concept of an original two-dimensional display and expanding an application field of display technology to more portable electronic devices. A user may fold or roll the electronic device with the flexible display panel as needed to reduce a size of the electronic device and improve a portability of the electronic device.

At present, in a conventional folding type electronic equipment, a folding plate and a hinge mechanism are usually used to realize the folding of a flexible screen. However, since the hinge mechanism is widely used, a structure is complicated, and a layout is dispersed, the hinge mechanism is easy to shake during the folding of the flexible screen under the driving of the folding plate or the hinge mechanism, resulted in that the movement of the folding type electronic equipment is unstable.

SUMMARY OF THE INVENTION

Embodiments of the present application provide a flexible display panel and an electronic device for alleviating disadvantages of an existing flexible display panel and the electronic device.

In order to solve the above technical problems, the present invention provides a flexible display panel including:
  a housing, a hinge received in the housing, and a flexible display panel body disposed in the housing and positioned on a side of the housing and the hinge, wherein the flexible display panel body includes a flexible portion corresponding to the hinge, and the hinge includes:
  a fixing bracket including a first fixing bracket and a second fixing bracket at opposite ends of the hinge;
  a supporting mechanism including a first supporting portion rotatably connected to a side of the fixing bracket along a first axis, and a second supporting portion rotatably connected to another side of the fixing bracket along a second axis;
  a rotating mechanism disposed between the first fixing bracket and the second fixing bracket, and including a first rotating shaft and a second rotating shaft rotatably connected to the fixing bracket, a first connecting member fixedly connected to the first rotating shaft, and a second connecting member fixedly connected to the second rotating shaft;
  wherein an end of the first connecting member includes a first fixing member and a second fixing member, the first fixing member and the second fixing member are fixedly connected to the first rotating shaft, another end of the first connecting member is slidably connected to the first supporting portion, an end of the second connecting member includes a third fixing member and a fourth fixing member, the third fixing member and the fourth fixing member are fixedly connected to the second rotating shaft, and another end of the second connecting member is slidably connected to the second supporting portion.

In the flexible display panel provided in the embodiment of the present application, the first fixing bracket includes a first slide groove, the second fixing bracket includes a second slide groove, the first supporting portion includes a first slider and a second slider, and the second supporting portion includes a third slider and a fourth slider;
  when the hinge is folded from an unfolded state to a fully folded state, the first slider rotates in the first slide groove along the first axis, the second slider rotates in the second slide groove along the first axis, the third slider rotates in the first slide groove along the second axis, and the fourth slider rotates in the second slide groove along the second axis.

In the flexible display panel provided in the embodiment of the present application, the first supporting portion includes a first recessed region, the second supporting portion includes a second recessed region, the first recessed region and the second recessed region are disposed opposite to each other, the first recessed region and the second recessed region are butted to form a first receiving groove for receiving the first connecting member and the second connecting member, and the first receiving groove is corresponding to an intermediate region of the supporting mechanism.

In the flexible display panel provided in the embodiment of the present application, the first supporting portion is provided with a third slide groove, and the second supporting portion is provided with a fourth slide groove;
  wherein an end of the first connecting member is slidably received in the third slide groove of the first supporting portion, and an end of the second connecting member is slidably received in the fourth slide groove of the second supporting portion.

In the flexible display panel provided in the embodiment of the present application, the third slide groove is positioned between the first slider and the second slider, and the fourth slide groove is positioned between the third slider and the fourth slider;
  an end of the first connecting member includes a first slide rail corresponding to the third slide groove, the first connecting member is slidably connected to the first supporting portion through the first slide rail, an end of the second connecting member includes a second slide rail corresponding to the fourth slide groove, and the second connecting member is slidably connected to the second supporting portion through the second slide rail.

In the flexible display panel provided in the embodiment of the present application, the hinge further includes a positioning mechanism, the first recessed region and the second recessed region abutting to form a second receiving groove for receiving the positioning mechanism.

In the flexible display panel provided by the present embodiment, the positioning mechanism includes a first positioning member and a second positioning member, the first positioning member is positioned between the first fixing bracket and the rotating mechanism, the second positioning member is positioned between the second fixing bracket and the rotating mechanism;

wherein the first positioning member and the second positioning member are sleeved on the first rotating shaft and second rotating shaft; the first positioning member includes a first protrusion toward the first fixing member, and a second protrusion toward the third fixing member; the second positioning member includes a third protrusion toward the second fixing member, and a fourth protrusion toward the fourth fixing member; the first fixing member is provided with a first groove; the second fixing member is provided with a second groove; the third fixing member is provided with a third groove, and the fourth fixing member is provided with a fourth groove;

when the hinge is folded from the unfolded state to the fully folded state, the first protrusion is received in the first groove, the second protrusion is received in the third groove, the third protrusion is received in the second groove, and the fourth protrusion is received in the fourth groove.

In the flexible display panel provided by the present embodiment, the positioning mechanism further includes a first elastic member, a second elastic member, a third elastic member, and a fourth elastic member;

the first elastic member and the second elastic member are positioned between the first fixing bracket and the first positioning member, and the third elastic member and the fourth elastic member are positioned between the second fixing bracket and the second positioning member;

the first elastic member and the third elastic member are sleeved on the first rotating shaft, an end of the first elastic member is connected to the first positioning member, another end of the first elastic member is connected to the first fixing bracket, an end of the third elastic member is connected to the second positioning member, and another end of the third elastic member is connected to the second fixing bracket;

the second elastic member and the fourth elastic member are sleeved on the second rotating shaft, an end of the second elastic member is connected to the first positioning member, another end of the second elastic member is connected to the first fixing bracket, an end of the fourth elastic member is connected to the second positioning member, and another end of the fourth elastic member is connected to the second fixing bracket;

when the hinge is folded from the unfolded state to the fully folded state, the first elastic member, the second elastic member, the third elastic member, and the fourth elastic member are in an elastically deformed state.

In the flexible display panel provided in the embodiment of the present application, the hinge further includes a first bracket between the second positioning member and the rotating mechanism, the first bracket is sleeved on the first rotating shaft and second rotating shaft, the first bracket is provided with a first recess and a second recess, the second fixing member is rotatably received in the first recess, and the fourth fixing member is rotatably received in the second recess;

the first fixing bracket includes a first fixing bracket body, a second bracket extending from an end of the first fixing bracket body, and a connecting portion connecting between the first fixing bracket body and the second bracket, the second bracket is sleeved on the first rotating shaft and the second rotating shaft, the second bracket is provided with a third recess and a fourth recess, the connecting portion is provided with a fixing groove, the first fixing member is rotatably received in the third recess, the third fixing member is rotatably received in the fourth recess, and the first positioning member is positioned between the second bracket and the first fixing bracket body and is mounted in the fixing groove.

In the flexible display panel provided in the present embodiment, the hinge further includes a synchronization mechanism positioned within the first receiving groove, and the synchronization mechanism includes a first synchronizing member, a second synchronizing member, and a third synchronizing member;

wherein the first synchronizing member is connected to the first rotating shaft, the second synchronizing member is connected to the second rotating shaft, and the first synchronizing member is synchronously connected to the second synchronizing member through the third synchronizing member to synchronously rotate the first rotating shaft and the second rotating shaft.

In the flexible display panel provided in the present embodiment, the first synchronizing member includes a first gear, the second synchronizing member includes a second gear, and the third synchronizing member includes two third gears meshing with each other;

wherein the two third gears are rotatably connected to the first bracket and the second bracket, the first gear is sleeved on the first rotating shaft, the second gear is sleeved on the second rotating shaft, the first gear is meshed with one of the two third gears, and the second gear is meshed with the other one of the two third gears.

In the flexible display panel provided in the embodiment of the present application, the flexible display panel further includes a back cover disposed corresponding to the hinge on a side of the hinge away from the flexible display panel body, the back cover and the hinge are fixedly connected.

In the flexible display panel provided in the embodiment of the present application, the first fixing member is provided with a first hole for the first rotating shaft to pass, the second fixing member is provided with a second hole for the first rotating shaft to pass, the third fixing member is provided with a third hole for the second rotating shaft to pass, and the fourth fixing member is provided with a fourth hole for the second rotating shaft to pass.

An embodiment of the present application further provides an electronic device including the above-described flexible display panel.

The beneficial effects of the embodiments of the present application lies in: the present application provides a flexible display panel and an electronic device. In the flexible display panel, a first connecting member is fixedly connected to a first rotating shaft through a first fixing member and a second fixing member, a second connecting member is fixedly connected to a second rotating shaft through a third fixing member and a fourth fixing member, and four groups of fixing structures are provided to increase a load value of a hinge at a rotating mechanism, thereby ensuring the stability of the flexible display panel when being folded.

BRIEF DESCRIPTION OF THE SEVERAL VIEWS OF THE DRAWINGS

The technical solutions and other beneficial effects of the present application will be apparent from the detailed description of the specific embodiments of the present application with reference to the accompanying drawings.

DESCRIPTION OF SPECIFIC EMBODIMENTS OF THE INVENTION

The present application provides a flexible display panel and an electronic device. In order to make the object, technical solution and effect of the present application more clear and clear, the following describes the present application in detail with reference to the accompanying drawings and examples. It should be understood that the specific embodiments described herein are intended to explain the present application only and are not intended to limit the present application.

The following describes the present application further with reference to the accompanying drawings and specific embodiments.

An embodiment of the present application provides a flexible display panel 100, and an electronic device including the flexible display panel 100. In the embodiment of the present application, the electronic device may be a mobile terminal such as a smartphone, a tablet computer, a notebook computer, or the like, or the electronic device may be a wearable terminal such as a smart watch, a smart band, smart glasses, an augmented reality device, or the electronic device may be a fixed terminal such as a desktop computer, a television, or the like.

Figure 1:
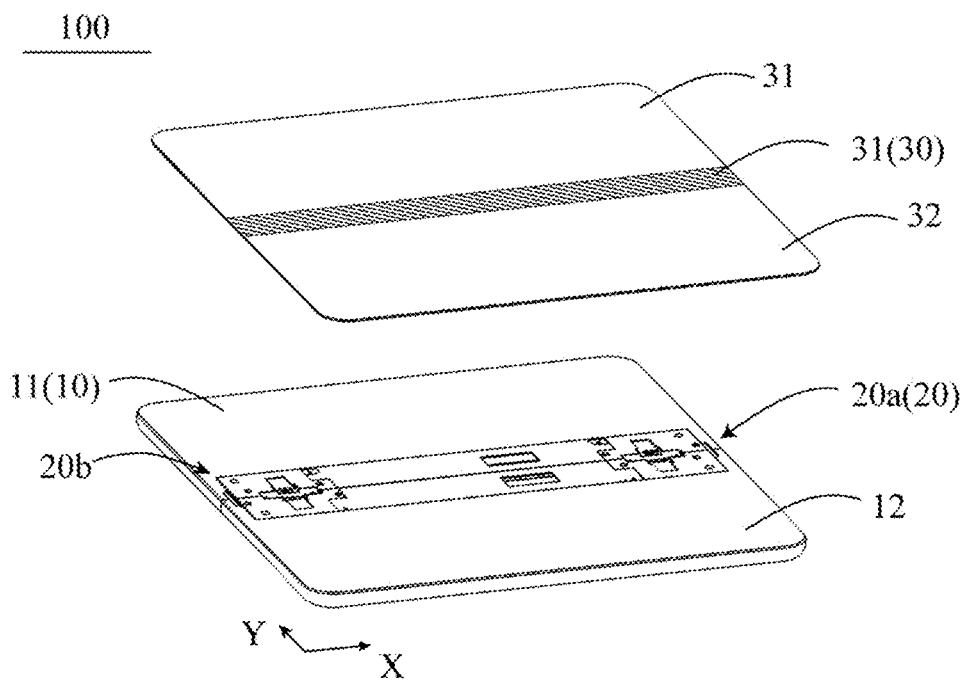
FIG. 1 is an exploded schematic diagram of a flexible display panel according to an embodiment of the present application.
Figure 2:
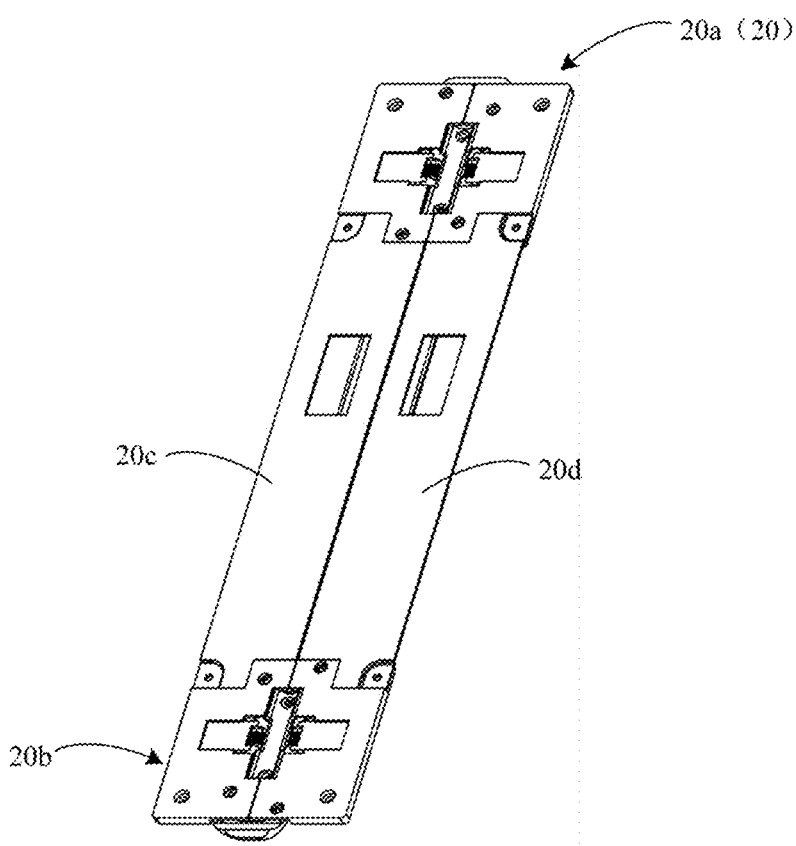
FIG. 2 is a schematic structural diagram of a hinge according to an embodiment of the present application.
Figure 3:
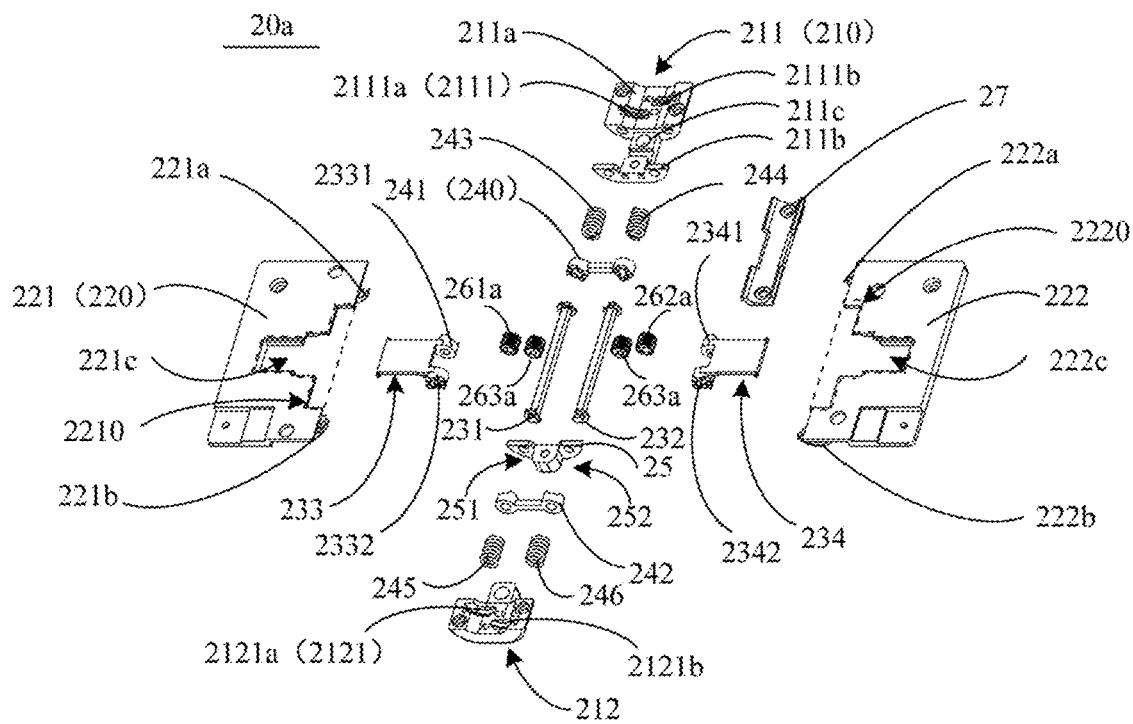
FIG. 3 is an exploded schematic diagram of a first hinge according to an embodiment of the present application.
Figure 4:
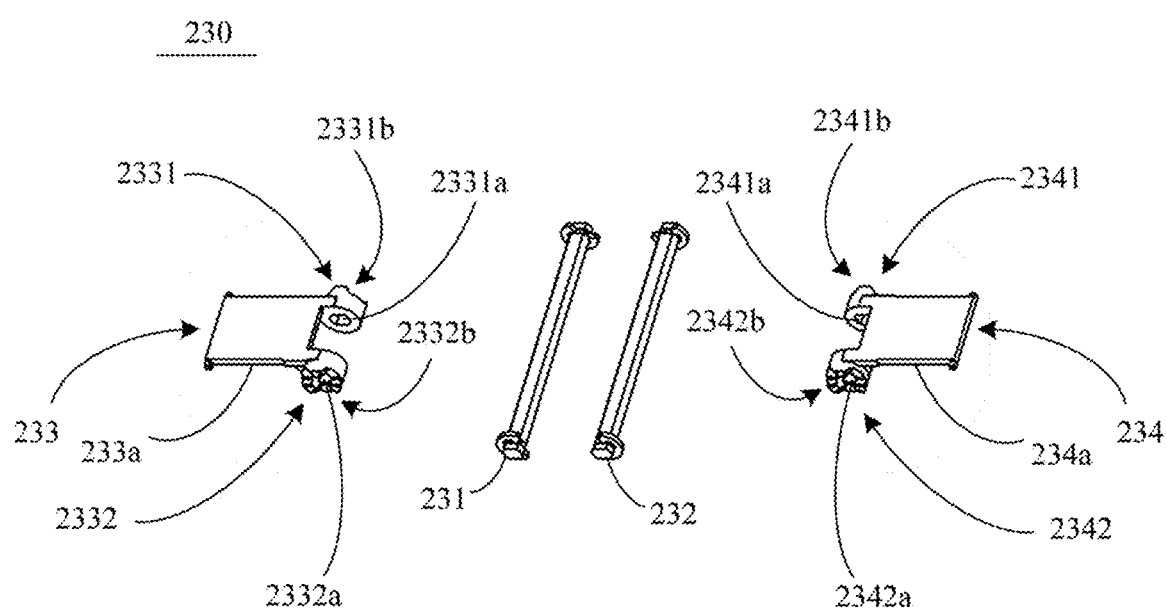
FIG. 4 is an exploded schematic diagram of a rotating mechanism according to an embodiment of the present application.

Referring to FIGS. 1, 2, 3, and 4, FIG. 1 is an exploded schematic diagram of a flexible display panel according to an embodiment of the present application; FIG. 2 is a schematic structural diagram of a hinge according to an embodiment of the present application; FIG. 3 is an exploded schematic diagram of a first hinge according to an embodiment of the present application; FIG. 4 is an exploded schematic diagram of the rotating mechanism according to an embodiment of the present application.

The present embodiment provides a flexible display panel 100 including a housing 10, a hinge 20 received in the housing 10, and a flexible display panel body 30 disposed in the housing 10 and positioned on a side of the housing 10 and the hinge 20, the flexible display panel body 30 including a flexible portion 32 corresponding to the hinge 20, wherein the housing 10 and the hinge 20 form a back support surface for the flexible display panel body 30, to support the flexible display panel body 30 during a transition between a unfolded state and a fully folded state.

The housing 10 includes a first housing 11 and a second housing 12 disposed opposite each other, the first housing 11 and the second housing 12 each having a recess (not shown) in a joint area, and the recess of the first housing 11 and the recess of the second housing 12 abutting on each other form a receptacle (not shown) for receiving the hinge 20. A region of the first housing 11 other than a recess and a region of the second housing 12 other than a recess forms a support plane for the flexible display panel body 30 respectively. Optionally, the first housing 11 and the second housing 12 have a same size and shape, and the receiving portion is provided corresponding to an intermediate region of the housing 10.

As can be understood, in the present embodiment, as shown in FIGS. 1 and 2, the hinge 20 includes a first hinge 20a, a second hinge 20b, and a connection structure between the first hinge 20a and the second hinge 20b and connecting the first hinge 20a and the second hinge 20b. The connection structure includes a first support plate 20c and a second support plate 20d which are oppositely disposed. The first support plate 20c can be connected to the first hinge 20a and the second hinge 20b by a threaded connection, an engagement, or the like, and the second support plate 20d can be connected to the first hinge 20a and the second hinge 20b by a threaded connection, an engagement, or the like.

The first hinge 20a, the second hinge 20b, the first support plate 20c, and the second support plate 20d are disposed in a receiving groove enclosed by the first housing 11 and the second housing 12, wherein the first support plate 20c is disposed corresponding to the first housing 11, the second support plate 20d is disposed corresponding to the second housing 12. The first housing 11, the first hinge 20a, the second hinge 20b, the first support plate 20c, the second support plate 20d, and the second housing 12 together form a support plane for the flexible display panel body 30 in a fully unfolded state of the flexible display panel 100.

Opposite sides of the first hinge 20a and opposite sides of the second hinge 20b are connected to the first housing 11 and the second housing 12. The first hinge 20a and the second hinge 20b may be configured to rotate the first housing 11 and the second housing 12 about two rotational axes parallel to a second direction y and spaced in a first direction x.

In the present embodiment, the structures of the first hinge 20a and the second hinge 20b are the same, and the movement process is the same. Therefore, only the structure of the first hinge 20a will be described below and in the accompanying drawings of the specification.

In the present embodiment, the first hinge 20a includes a fixing bracket 210, a supporting mechanism 220, and a rotating mechanism 230. The fixing bracket 210 includes a first fixing bracket 211 and a second fixing bracket 212 at opposite ends of the first hinge 20a. The supporting mechanism 220 includes a first supporting portion 221 and a second supporting portion 222, the first supporting portion 221 is rotatably connected to a side of the fixing bracket 210 along a first axis, the second supporting portion 222 is rotatably connected to another side of the fixing bracket 210 along a second axis. The rotating mechanism 230 is disposed between the first fixing bracket 211 and the second fixing bracket 212, the rotating mechanism 230 includes a first rotating shaft 231 and a second rotating shaft 232 rotatably connected to the fixing bracket 210, a first connecting member 233 fixedly connected to the first rotating shaft 231, and a second connecting member 234 fixedly connected to the second rotating shaft 232.

Wherein an end of the first connecting member 233 includes a first fixing member 2331 and a second fixing member 2332, the first fixing member 2331 and the second fixing member 2332 are fixedly connected to the first rotating shaft 231, another end of the first connecting member 233 is slidably connected to the first supporting portion 221. An end of the second connecting member 234 includes a third fixing member 2341 and a fourth fixing member 2342, the third fixing member 2341 and the fourth fixing member 2342 are fixedly connected to the second rotating shaft 232, and another end of the second connecting member 234 is slidably connected to the second supporting portion 222.

In this embodiment, the first fixing member 2331 is provided with a first hole 2331a through which the first rotating shaft 231 passes, and the second fixing member 2332 is provided with a second hole 2332a through which the first rotating shaft 231 passes. The first hole 2331a and the second hole 2332a are collinear in axis. Specifically, the first hole 2331a and the second hole 2332a are equal in size and are both fixing holes, and the first rotating shaft 231 is fixedly connected to the first fixing member 2331 through the first hole 2331a and the second hole 2332a. The third fixing member 2341 is provided with a third hole 2341a through which the second rotating shaft 232 passes, and the fourth fixing member 2342 is provided with a fourth hole 2342a through which the second rotating shaft 232 passes. The third hole 2341a and the fourth hole 2342a are collinear in axis. Specifically, the third hole 2341a and the fourth hole 2342a are equal in size and are both fixing holes, and the second rotating shaft 232 is fixedly connected to the second fixing member 2332 through the third hole 2341a and the fourth hole 2342a.

Preferably, the first fixing member 2331 and the second fixing member 2332 are fixed to the first rotating shaft 231 by inserting the first rotating shaft 231 through the first hole 2331a and the second hole 2332a, and a shaft pin is inserted into the first hole 2331a and the second hole 2332a, respectively. The third fixing member 2341 and the fourth fixing member 2342 are fixed to the second rotating shaft 232 by inserting the second rotating shaft 232 through the third hole 2341a and the fourth hole 2342a, and a shaft pin is inserted into the third hole 2341a and the fourth hole 2342a, respectively. It is understood that a means by inserting a shaft pin into a hole to fix a fixing member provided in the embodiments is merely for illustration. The embodiment does not specifically limit the method of the first fixing member 2331 and the second fixing member 2332 fixing to the first rotating shaft 231, and the method of the third fixing member 2341 and the fourth fixing member 2342 fixing to the second rotating shaft 232.

It will be understood that the present embodiment provides that the first connecting member 233 is fixedly connected to the first rotating shaft 231 through the first fixing member 2331 and the second fixing member 2332, the second connecting member 234 is fixedly connected to the second rotating shaft 232 through the third fixing member 2341 and the fourth fixing member 2342. The first connecting member 233 is rotatably connected to the fixing bracket 210 through the first rotating shaft 231, the second connecting member 234 is rotatably connected to the fixing bracket 210 through the second rotating shaft 232. Since the first connecting member 233 is fixedly connected to the first rotating shaft 231 through the first fixing member 2331 and the second fixing member 2332, the second connecting member 234 is fixedly connected to the second rotating shaft 232 through the third fixing member 2341 and the fourth fixing member 2342, a load value of the first hinge 20a at the rotating mechanism 230 is increased to ensure the stability when the flexible display panel 100 is folded; at the same time, the risk of the wear of the rotating mechanism 230 due to excessive force when the flexible display panel 100 is in the folded state is reduced.

In this embodiment, the first supporting portion 221 is connected to the first housing 11, the second supporting portion 222 is connected to the second housing 12, and in actual application, the first supporting portion 221 may be fixedly connected to the first housing 11 by a screw connection, an engagement, or the like, and the second supporting portion 222 may be fixedly connected to the second housing 12 by a screw connection, an engagement, or the like. Material of the first housing 11, the second housing 12, the first supporting portion 221 and the second supporting portion 222 is not limited to steel. Meanwhile, the first rotating shaft 231 and the second rotating shaft 232 are not on the same axis, and both the first axis and the second axis may be virtual axes or solid axes, which is not specifically limited in this embodiment.

Figure 5:
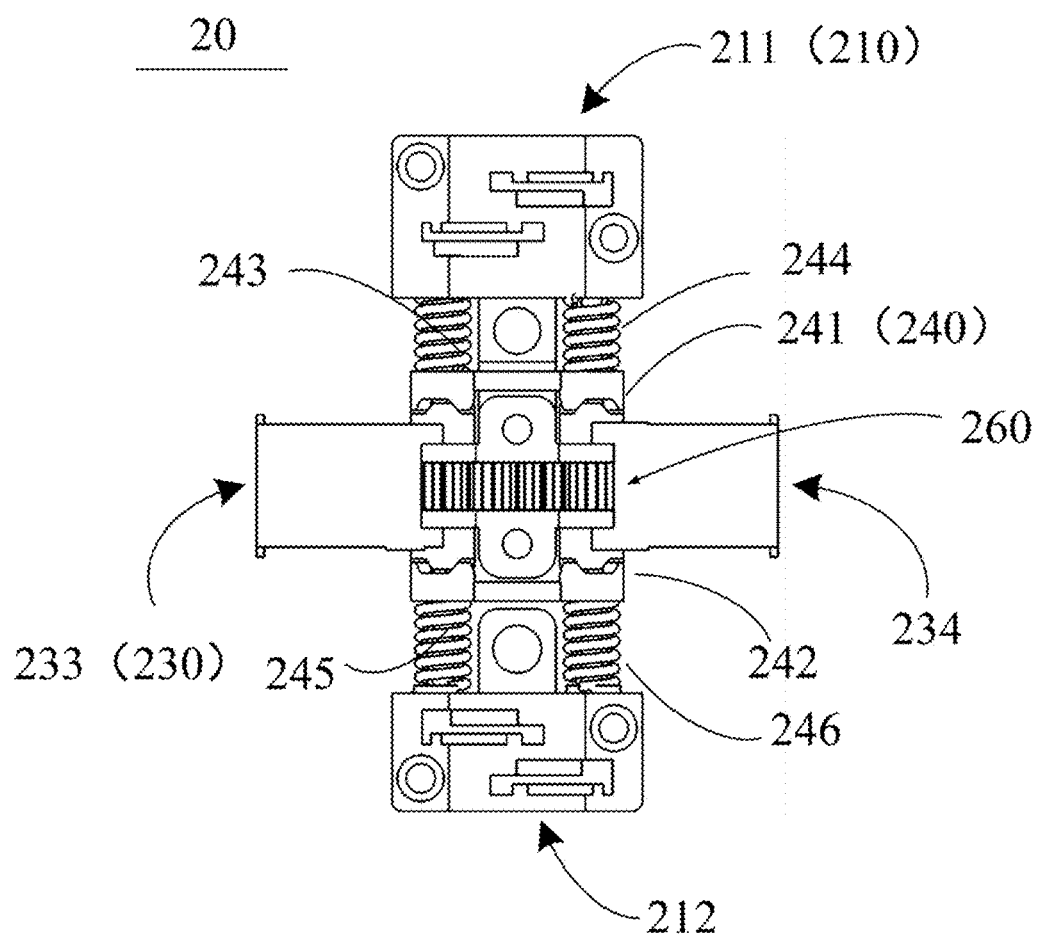
FIG. 5 is a top schematic diagram of a first hinge in an unfolded state according to an embodiment of the present application.
Figure 6:
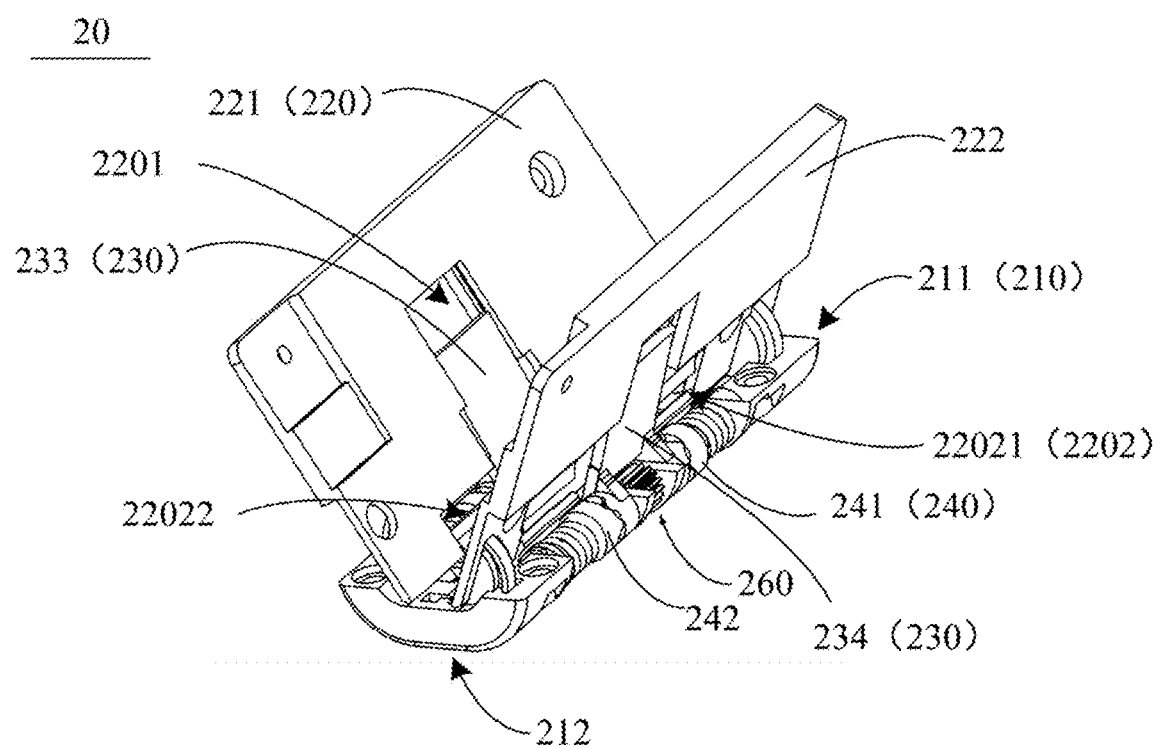
FIG. 6 is a schematic diagram of a first hinge in a transitional folded state according to an embodiment of the present application.
Figure 7:
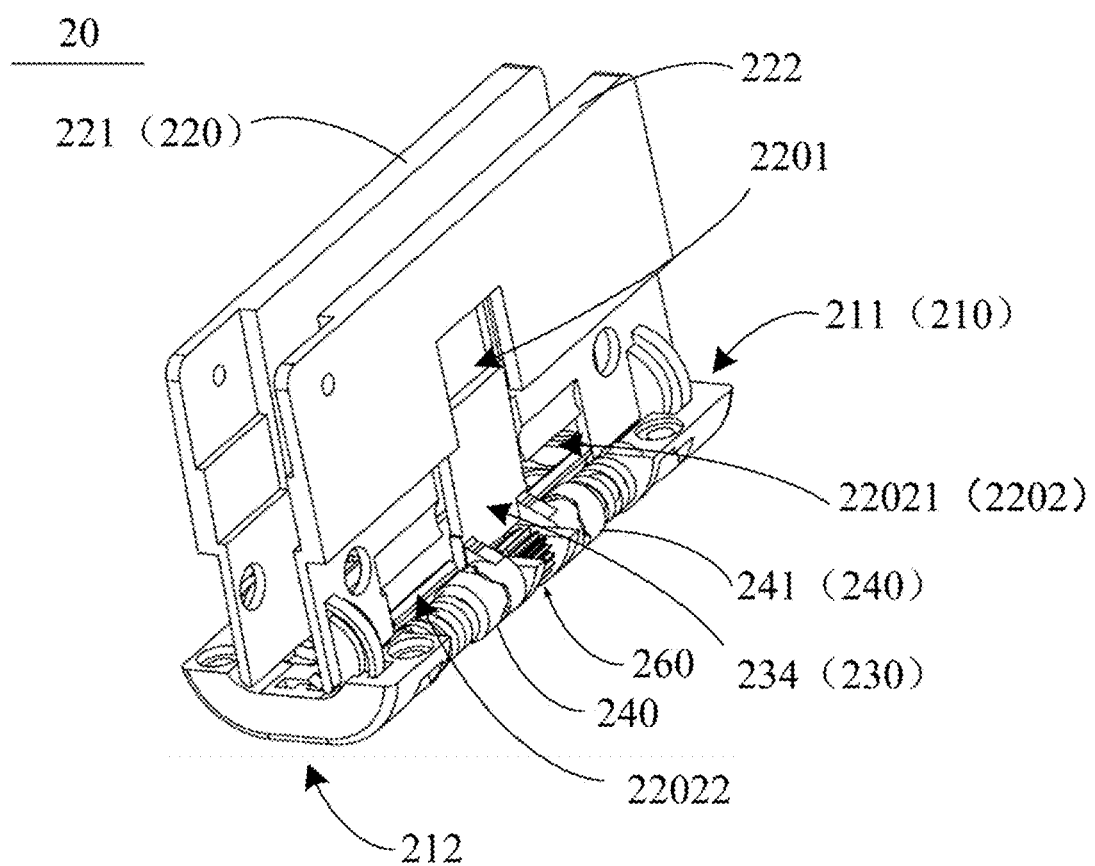
FIG. 7 is a schematic diagram of a first hinge in a fully folded state according to an embodiment of the present application.

Referring to FIGS. 3, 5, 6, and 7, FIG. 5 is a top schematic diagram of a first hinge in an unfolded state according to an embodiment of the present application; FIG. 6 is a schematic diagram of a first hinge in a transitional folded state according to an embodiment of the present application; FIG. 7 is a schematic diagram of a first hinge in a fully folded state according to an embodiment of the present application.

In the present embodiment, the first fixing bracket 211 includes a first slide groove 2111, the second fixing bracket 212 includes a second slide groove 2121, the first supporting portion 221 includes a first slider 221a and a second slider 221b, and the second supporting portion 222 includes a third slider 222a and a fourth slider 222b. Preferably, the first slide groove 2111 and the second slide groove 2121 are arc-shaped slide grooves, and the first slider 221a, the second slider 221b, the third slider 222a, and the fourth slider 222b are arc-shaped sliders. The first slider 221a and the third slider 222a can rotate within the first slide groove 2111, and the second slider 221b and the fourth slider 222b can rotate within the second slide groove 2121.

Further, the first slide groove 2111 includes a first sub-slide groove 2111a and a second sub-slide groove 2111b, the second slide groove 2121 includes a third sub-slide groove 2121a and a fourth sub-slide groove 2121b, and bottoms of the first sub-slide groove 2111a, the second sub-slide groove 2111b, the third sub-slide groove 2121a, and the fourth sub-slide groove 2121b each have a circular arc structure, wherein the first slider 221a matches with the first sub-slide groove 2111a, the second slider 221b matches with the third sub-slide groove 2121a, the third slider 222a matches with the second sub-slide groove 2111b, and the fourth slider 222b matches with the fourth sub-slide groove 2121b.

Referring to FIGS. 5, 6 and 7, when the first hinge 20a is folded from the unfolded state to the fully folded state, the first slider 221a rotates along the first axis in the first sub-slide groove 2111a, the second slider 221b rotates along the first axis in the third sub-slide groove 2121a, the third slider 222a rotates along the second axis in the second sub-slide groove 2111b, and the fourth slider 222b rotates along the second axis in the fourth sub-slide groove 2121b. That is, in this embodiment, the change of the relative positional relationship between the first slider 221a and the first sub-slide groove 2111a, and the change of the relative positional relationship between the second slider 221b and the third sub-slide groove 2121a drive the change of the relative position between the first supporting portion 221 and the fixing bracket 210. The change of the relative positional relationship between the third slider 222a and the second sub-slide groove 2111b, and the change of the relative positional relationship between the fourth slider 222b and the fourth sub-slide groove 2121b drive the change of the relative position between the second supporting portion 222 and the fixing bracket 210.

It should be noted that when the first hinge 20a is folded from the fully folded state to the unfolded state, the change of the relative position between the first supporting portion 221 and the fixing bracket 210 and the change of the relative position between the second supporting portion 222 and the fixing bracket 210 are the same as the above-described principle of the changes in the position, and the present embodiment is not repeated.

It can be understood that in the present embodiment, the rotation direction of the first slider 221a is defined by the first sub-slide groove 2111a, the rotation direction of the second slider 221b is defined by the third sub-slide groove 2121a, so as to avoid an unnecessary movement trajectory of the first supporting portion 221 when rotates. The rotation direction of the third slider 222a is defined by the second sub-slide groove 2111b, and the rotation direction of the fourth slider 222b is defined by the fourth sub-slide groove 2121b, so as to avoid an unnecessary movement trajectory of the second supporting portion 222 when rotates. Thus, the first hinge 20a keeps more stable in the movement and ensure the overall balance of the first hinge 20a, at the same time, the first fixing bracket 211 and the second fixing bracket 212 are positioned at opposite ends of the first hinge 20a to ensure that the first supporting portion 221 stably drives the first housing 11 during rotation and the second supporting portion 222 stably drives the second housing 12 during rotation.

Further, the first supporting portion 221 includes a first recessed region 2210, the second supporting portion 222 includes a second recessed region 2220, the first recessed region 2210 and the second recessed region 2220 are disposed opposite to each other, the first recessed region 2210 and the second recessed region 2220 are butted to form a first receiving groove 2201 for receiving the first connecting member 233 and the second connecting member 234, and the first receiving groove 2201 is corresponding to an intermediate region of the supporting mechanism 220.

It will be understood that according to the present embodiment, the integrity and stability of the structure of the first hinge 20a is increased by providing the first connecting member 233 and the second connecting member 234 of the rotating mechanism 230 in the first receiving groove 2201 enclosed by the first supporting portion 221 and the second supporting portion 222, thereby effectively preventing the rotating mechanism 230 and the supporting mechanism 220 from being worn due to shaking relative to each other during movement of the first hinge 20a.

Specifically, the first recessed region 2210 is provided with a third slide groove 221c, and the second recessed region 2220 is provided with a fourth slide groove 222c. Wherein the end of the first connecting member 233 is slidably received in the third slide groove 221c of the first supporting portion 221, and the end of the second connecting member 234 is slidably received in the fourth slide groove 222c of the second supporting portion 222.

The third slide groove 221c is positioned between the first slider 221a and the second slider 221b, and the fourth slide groove 222c is positioned between the third slider 222a and the fourth slider 222b. The end of the first connecting member 233 includes a first slide rail 233a corresponding to the third slide groove 221c, the first connecting member 233 is slidably connected to the first supporting portion 221 through the first slide rail 233a. The end of the second connecting member 234 includes a second slide rail 234a corresponding to the fourth slide groove 222c, and the second connecting member 234 is slidably connected to the second supporting portion 222 through the second slide rail 234a.

Referring to FIGS. 5, 6, and 7, when the first hinge 20a is folded from the unfolded state to the fully folded state, the first connecting member 233 is gradually disengaged from the third slide groove 221c, the second connecting member 234 is gradually disengaged from the fourth slide groove 222c, that is, the first supporting portion 221 gradually moves away from the first connecting member 233, and the second supporting portion 222 gradually moves away from the second connecting member 234, thereby allowing an accommodation space for receiving the flexible portion 32 of the flexible display panel body 30, and preventing the first supporting portion 221 and the second supporting portion 222 from squeezing the flexible portion 32 of the flexible display panel body 30.

Further, referring to FIG. 1, the flexible display panel body 30 further includes a first portion 31 and a second portion 32 on opposite sides of the flexible portion 32. When the first hinge 20a is in an unfolded state, the flexible portion 32 is in an unfolded state, and the first supporting portion 221 and the second supporting portion 222 jointly support the first portion 31, the second portion 32, and the flexible portion 32.

When the first hinge 20a is folded from an unfolded state to a fully folded state, the first hinge 20a is in a folded state, the flexible portion 32 is in a bent state, and the first supporting portion 221 and the second supporting portion 222 are disposed opposite to each other and support the first portion 31 and the second portion 32, respectively. In a direction along the first supporting portion 221 and the second supporting portion 222 toward the fixing bracket 210, the first portion 31 and the second portion 32 have a first included angle, the second supporting portion 222 and the second supporting portion 222 have a second included angle, and the first included angle is equal to the second included angle.

Figure 8:
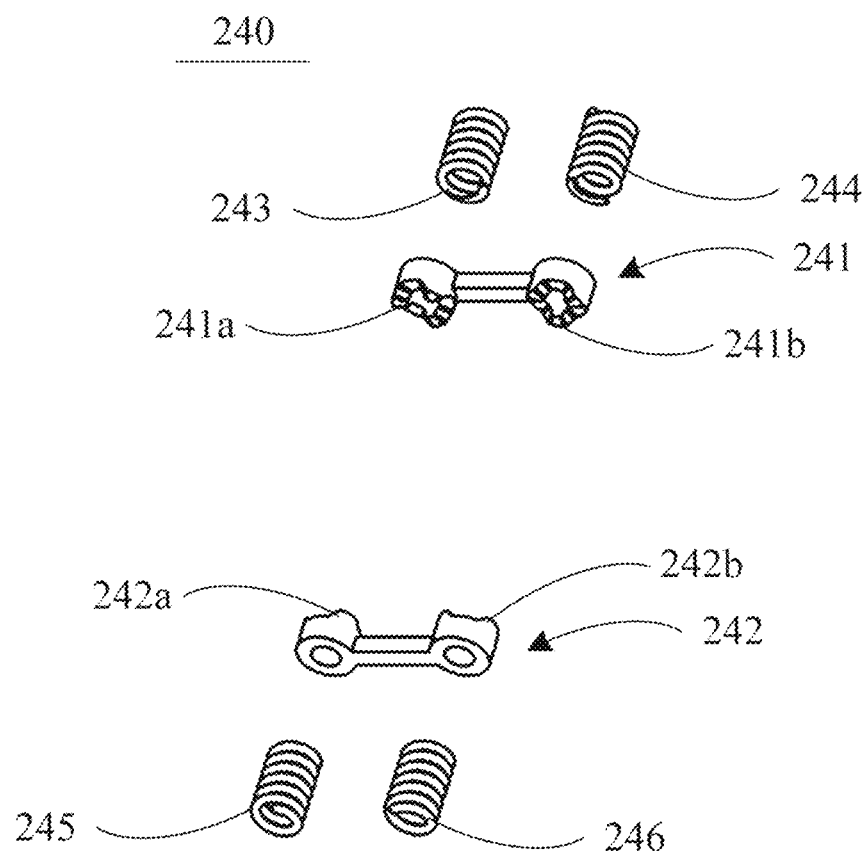
FIG. 8 is an exploded schematic diagram of a positioning mechanism according to an embodiment of the present application.

Referring to FIGS. 3, 5, and 8, FIG. 8 is an exploded schematic diagram of a positioning mechanism according to an embodiment of the present application.

In the present embodiment, the first hinge 20a further includes a positioning mechanism 240, the first recessed region 2210 and the second recessed region 2220 abutting to form a second receiving groove 2202 for receiving the positioning mechanism 240. Further, the positioning mechanism 240 includes a first positioning member 241 and a second positioning member 242, the second receiving groove 2202 includes a first receiving sub-groove 22021 and a second receiving sub-groove 22022 positioned on opposite sides of the first receiving groove 2201, the first positioning member 241 is positioned in the first receiving sub-groove 22021, and the second positioning member 242 is positioned in the second receiving sub-groove 22022.

It will be understood that according to the present embodiment, the integrity and stability of the structure of the first hinge 20a is effectively increased by positioning the positioning mechanism 240 in the second receiving groove 2202 enclosed by the first supporting portion 221 and the second supporting portion 222, thereby avoiding a dispersed layout of the existing hinge mechanism which results in unstable movement of the folding electronic device due to the shaking of the hinge mechanism during folding the flexible screen.

Preferably, the positioning mechanism 240 includes a first positioning member 241 positioned between the first fixing bracket 211 and the rotating mechanism 230, and a second positioning member 242 positioned between the second fixing bracket 212 and the rotating mechanism 230. Wherein both the first positioning member 241 and the second positioning member 242 are sleeved on the first rotating shaft 231 and the second rotating shaft 232. The first positioning member 241 includes a first protrusion 241a facing the first fixing member 2331 and a second protrusion 241b facing the third fixing member 2341, and the second positioning member 242 includes a third protrusion 242a facing the second fixing member 2332 and a fourth protrusion 242b facing the fourth fixing member 2342. The first fixing member 2331 is provided with a first groove 2331b, the second fixing member 2332 is provided with a second groove 2332b, the third fixing member 2341 is provided with a third groove 2341b, and the fourth fixing member 2342 is provided with a fourth groove 2342b.

When the first hinge 20a is folded from the unfolded state to the fully folded state, the first protrusion 241a is received in the first groove 2331b, the second protrusion 241b is received in the third groove 2341b, the third protrusion 242a is received in the second groove 2332b, and the fourth protrusion 242b is received in the fourth groove 2342b.

The positioning mechanism 240 further includes a first elastic member 243, a second elastic member 244, a third elastic member 245, and a fourth elastic member 246. The first elastic member 243 and the second elastic member 244 are positioned between the first fixing bracket 211 and the first positioning member 241, and the third elastic member 245 and the fourth elastic member 246 are positioned between the second fixing bracket 212 and the second positioning member 242.

Both the first elastic member 243 and the third elastic member 245 are sleeved on the first rotating shaft 231. An end of the first elastic member 243 is connected to the first positioning member 241, and another end of the first elastic member 243 is connected to the first fixing bracket 211. An end of the third elastic member 245 is connected to the second positioning member 242, and another end of the third elastic member 245 is connected to the second fixing bracket 212.

Both the second elastic member 244 and the fourth elastic member 246 are sleeved on the second rotating shaft 232. An end of the second elastic member 244 is connected to the first positioning member 241, and another end of the second elastic member 244 is connected to the first fixing bracket 211. An end of the fourth elastic member 246 is connected to the second positioning member 242, and another end of the fourth elastic member 246 is connected to the second fixing bracket 212.

Referring to FIGS. 5 and 6, when the first hinge 20a is in the transitional folded state or the fully folded state, the first elastic member 243, the second elastic member 244, the third elastic member 245, and the fourth elastic member 246 are all in the elastically deformed state.

In the present embodiment, when the first connecting member 233 rotates, the first groove 2331b and the second groove 2332b rotate accordingly, the first protrusion 241a is received in the first groove 2331b, and the third protrusion 242a is received in the second groove 2332b. When the second connecting member 234 rotates, the second groove 2332b and the fourth groove 2342b rotate accordingly, the third protrusion 242a is received in the second groove 2332b, and the fourth protrusion 242b is received in the fourth groove 2342b. The first connecting member 233, the second connecting member 234, the first positioning member 241, and the second positioning member 242 are switched to a preset fit state.

Specifically, the first positioning member 241 may include one first protrusion 241a and one second protrusion 241b, and the second positioning member 242 may include one third protrusion 242a and one fourth protrusion 242b. The first fixing member 2331 is provided with a plurality of first grooves 2331b, the second fixing member 2332 is provided with a plurality of second grooves 2332b, the third fixing member 2341 is provided with a plurality of third grooves 2341b, and the fourth fixing member 2342 is provided with a plurality of fourth grooves 2342b, so that when the first protrusion 241a is received in the first grooves 2331b at different positions, the second protrusion 241b is received in the third grooves 2341b at different positions, the third protrusion 242a is received in the second grooves 2332b at different positions, and the fourth protrusion 242b is received in the fourth grooves 2342b at different positions. When the first hinge 20a is folded, the first hinge 20a can be maintained in a different fully folded state, for example, the first connecting member 233 and the second connecting member 234 may be maintained at an angle of 30°, 45°, 60°, or 90° to the horizontal plane.

It should be noted that in the present embodiment, when the first connecting member 233 and the second connecting member 234 rotate, the first protrusion 241a and the first groove 2331b engage, the second protrusion 241b and the third groove 2341b engage, and then the first positioning member 241 moves in a direction away from the rotating mechanism 230, so that both the first elastic member 243 and the second elastic member 244 are compressed. When the first elastic member 243 and the second elastic member 244 in a compressed state are restored to deform, the first elastic member 243 and the second elastic member 244 provide a force to move the first positioning member 241 close to the rotating mechanism 230, so as to accelerate the first protrusion 241a and the first groove 2331b to engage, and the second protrusion 241b and the third groove 2341b to engage.

At the same time, the third protrusion 242a and the second groove 2332b are engaged, the fourth protrusion 242b and the fourth groove 2342b are engaged, and then the second positioning member 242 is pushed to move in a direction away from the rotating mechanism 230, so that both the third elastic member 245 and the fourth elastic member 246 are compressed. When the third elastic member 245 and the fourth elastic member 246 in a compressed state are restored to deform, the third elastic member 245 and the fourth elastic member 246 provide a force to move the second positioning member 242 close to the rotating mechanism 230, so as to accelerate the third protrusion 242a and the second groove 2332b to engage, and the fourth protrusion 242b and the fourth groove 2342b to engage. That is, in this embodiment, the first hinge 20a can realize the stopping function at different angles by providing the parameters of the first elastic member 243, the second elastic member 244, the third elastic member 245, and the fourth elastic member 246 to control the force needed.

It will be appreciated that the first positioning member 241 may include one first protrusion 241a and one second protrusion 241b, and that the second positioning member 242 may include one third protrusion 242a and one fourth protrusion 242b for illustration only, which is not limited in this embodiment.

It should be noted that the materials of the first positioning member 241 and the second positioning member 242 include but are not limited to steel, and the first elastic member 243, the second elastic member 244, the third elastic member 245, and the fourth elastic member 246 include but are not limited to springs, which are not specifically limited in this embodiment.

Further, in the present embodiment, the first hinge 20a further includes a first bracket 25 positioned between the second positioning member 242 and the rotating mechanism 230. The first bracket 25 is sleeved on the first rotating shaft 231 and the second rotating shaft 232. The first bracket 25 is provided with a first recess 251 and a second recess 252, the second fixing member 2332 is rotatably received in the first recess 251, and the fourth fixing member 2342 is rotatably received in the second recess 252.

The first fixing bracket 211 includes a first fixing bracket body 211a, a second bracket 211b extending from an end of the first fixing bracket body 211a, and a connecting portion 211c connecting the first fixing bracket body 211a and the second bracket 211b. The second bracket 211b is sleeved on the first rotating shaft 231 and the second rotating shaft 232. The second bracket 211b is provided with a third recess (not shown) and a fourth recess (not shown). The connecting portion 211c is provided with a fixing groove (not shown). The first fixing member 2331 is rotatably received in the third recess, the third fixing member 2341 is rotatably received in the fourth recess, and the first positioning member 241 is mounted in the fixing groove and positioned between the second bracket 211b and the first fixing bracket body 211a.

Further, an end of the first elastic member 243 is connected to the first positioning member 241, another end of the first elastic member 243 is connected to the first fixing bracket body 211a, an end of the second elastic member 244 is connected to the first positioning member 241, and another end of the second elastic member 244 is connected to the first fixing bracket body 211a.

Figure 9:
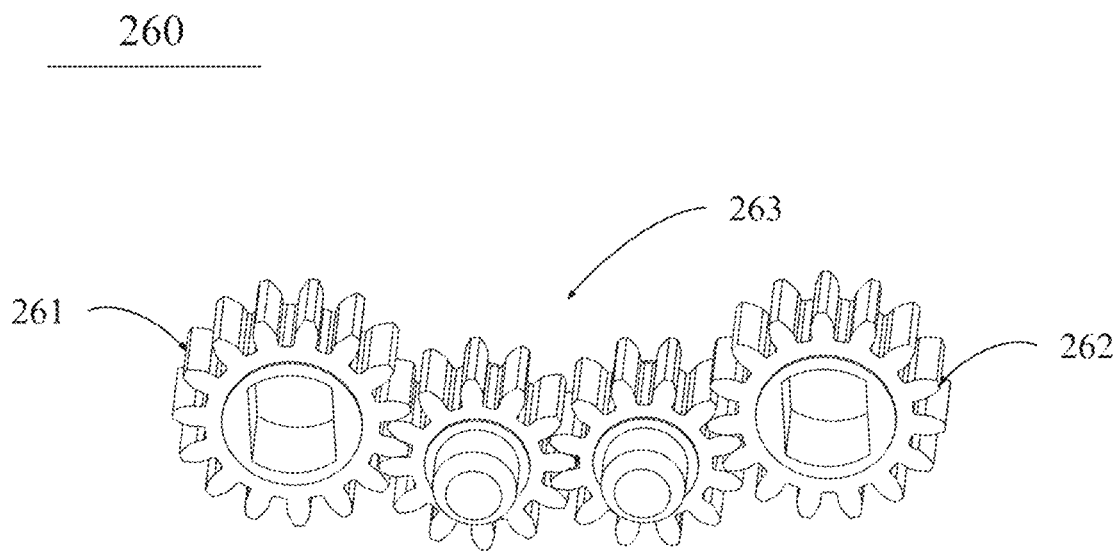
FIG. 9 is a schematic diagram of a synchronization mechanism according to an embodiment of the present application.

Referring to FIGS. 3, 5, and 9, FIG. 9 is a schematic diagram of a synchronization mechanism according to an embodiment of the present application.

In the present embodiment, the first hinge 20a further includes a synchronization mechanism 260 positioned in the first receiving groove 2201, specifically, the synchronization mechanism 260 is positioned between the first connecting member 233 and the second connecting member 234, and includes a first synchronizing member 261, a second synchronizing member 262, and a third synchronizing member 263.

The first synchronizing member 261 is positioned between the first fixing member 2331 and the second fixing member 2332, and is connected to the first rotating shaft 231. The second synchronizing member 262 is positioned between the third fixing member 2341 and the fourth fixing member 2342, and is connected to the second rotating shaft 232. The first synchronizing member 261 is synchronously connected to the second synchronizing member 262 through the third synchronizing member 263 to synchronously rotate the first rotating shaft 231 and the second rotating shaft 232.

In the present embodiment, the synchronization mechanism 260, the rotating mechanism 230, and the positioning mechanism 240 cooperate. The synchronization mechanism 260 and the rotating mechanism 230 can drive the first supporting portion 221 and the second supporting portion 222 to rotate synchronously along the fixing bracket 210, respectively, thereby improving the consistency and stability of the movement of the first hinge 20a.

Further, the synchronization mechanism 260 and the rotating mechanism 230 can drive the first slider 221a to rotate in the first sub-slide groove 2111a, drive the second slider 221b to rotate in the third sub-slide groove 2121a, drive the third slider 222a to rotate in the second sub-slide groove 2111b, and drive the fourth slider 222b to rotate in the fourth sub-slide groove 2121b, thereby realizing a state change of the first hinge 20a.

Specifically, the first synchronizing member 261 includes a first gear 261a, the second synchronizing member 262 includes a second gear 262a, and the third synchronizing member 263 includes two third gears 263a meshed with each other. The two third gears 263a are rotatably connected to the first bracket 25 and the second bracket 211b, the first gear 261a is sleeved on the first rotating shaft 231, and the second gear 262a is sleeved on the second rotating shaft 232. The first gear 261a is meshed with one of the two third gears 263a, and the second gear 262a is meshed with the other of the two third gears 263a.

It should be noted that the first synchronizing member 261 includes a first gear 261a, the second synchronizing member 262 includes a second gear 262a, and the third synchronizing member 263 includes two third gears 263a meshed with each other. This embodiment does not specifically limit the type of the synchronization mechanism 260.

It should be noted that in the present embodiment, the folding display device further includes a back cover (not shown) provided corresponding to the first hinge 20a, the back cover is positioned on a side of the first hinge 20a away from the flexible display panel body 30, and the back cover is fixedly connected to the fixing bracket 210. It will be understood that the back cover serves to shield and protect the first hinge 20a when the flexible display panel 100 is in a folded state, and that the user cannot see the first hinge 20a due to the shielding of the back cover, thereby improving aesthetics.

The flexible display panel 100 further includes a decorative cover 27 positioned between the first supporting portion 221 and the second supporting portion 222 for covering an exposed area between the first supporting portion 221 and the second supporting portion 222 to avoid an exposure of the first hinge 20a. At the same time, the decorative cover 27 includes an arc-shaped groove to allow a receiving space for receiving the flexible portion 32 of the flexible display panel body 30, thereby avoiding squeezing the flexible portion 32 of the flexible display panel body 30 when the flexible display panel 100 is bent.

The present embodiment also provides an electronic device including the flexible display panel 100 of any of the above embodiments.

The flexible display panel 100 has been described in detail in the above-described embodiment, and is not repeated herein.

The present application discloses a flexible display panel and an electronic device, the flexible display panel including a housing, a hinge received in the housing, and a flexible display panel body disposed in the housing and positioned on a side of the housing and the hinge. The flexible display panel body includes a flexible portion corresponding to the hinge. The hinge includes a fixing bracket including a first fixing bracket and a second fixing bracket at opposite ends of the hinge; a supporting mechanism including a first supporting portion rotatably connected to a side of the fixing bracket along a first axis and a second supporting portion rotatably connected to another side of the fixing bracket along a second axis; a rotating mechanism disposed between the first fixing bracket and the second fixing bracket, and including a first rotating shaft and a second rotating shaft rotatably connected to the fixing bracket, a first connecting member fixedly connected to the first rotating shaft, and a second connecting member fixedly connected to the second rotating shaft; wherein an end of the first connecting member includes a first fixing member and a second fixing member, the first fixing member and the second fixing member are fixedly connected to the first rotating shaft, another end of the first connecting member is slidably connected to the first supporting portion, an end of the second connecting member includes a third fixing member and a fourth fixing member, the third fixing member and the fourth fixing member are fixedly connected to the second rotating shaft, and another end of the second connecting member is slidably connected to the second supporting portion, so as to improve integrity and stability of the hinge, avoid a problem that a plurality of components in a conventional hinge structure are relatively large, a structure is complex, a layout is dispersed, and the hinge is easy to shake, thereby causing an unstable movement of a flexible display panel.

It will be understood that those skilled in the art may make equivalent replacements or changes in accordance with the technical solutions of the present application and the inventive concepts thereof, all of which shall fall within the scope of the claims appended hereto.

What is claimed is:

1. A flexible display panel, comprising a housing, a hinge received in the housing, and a flexible display panel body disposed in the housing and positioned on a side of the housing and the hinge, wherein the flexible display panel body comprises a flexible portion corresponding to the hinge, and the hinge comprises:
    a fixing bracket comprising a first fixing bracket and a second fixing bracket at opposite ends of the hinge;
    a supporting mechanism comprising a first supporting portion rotatably connected to a side of the fixing bracket along a first axis, and a second supporting portion rotatably connected to another side of the fixing bracket along a second axis;
    a rotating mechanism disposed between the first fixing bracket and the second fixing bracket, and comprising a first rotating shaft and a second rotating shaft rotatably connected to the fixing bracket, a first connecting member fixedly connected to the first rotating shaft, and a second connecting member fixedly connected to the second rotating shaft; and
    wherein an end of the first connecting member comprises a first fixing member and a second fixing member, the first fixing member and the second fixing member are fixedly connected to the first rotating shaft, another end of the first connecting member is slidably connected to the first supporting portion, an end of the second connecting member comprises a third fixing member and a fourth fixing member, the third fixing member and the fourth fixing member are fixedly connected to the second rotating shaft, and another end of the second connecting member is slidably connected to the second supporting portion;
    wherein the first supporting portion comprises a first recessed region, the second supporting portion comprises a second recessed region, the first recessed region and the second recessed region are disposed opposite to each other, the first recessed region and the second recessed region are butted to form a first receiving groove for receiving the first connecting member and the second connecting member, and the first receiving groove is corresponding to an intermediate region of the supporting mechanism.

2. The flexible display panel of claim 1, wherein the first fixing bracket comprises a first slide groove, the second fixing bracket comprises a second slide groove, the first supporting portion comprises a first slider and a second slider, and the second supporting portion comprises a third slider and a fourth slider;
    when the hinge is folded from an unfolded state to a fully folded state, the first slider rotates in the first slide groove along the first axis, the second slider rotates in the second slide groove along the first axis, the third slider rotates in the first slide groove along the second axis, and the fourth slider rotates in the second slide groove along the second axis.

3. The flexible display panel of claim 1, wherein the flexible display panel further comprises a back cover disposed corresponding to the hinge on a side of the hinge away from the flexible display panel body, the back cover and the hinge are fixedly connected.

4. The flexible display panel of claim 1, wherein the first fixing member is provided with a first hole for the first rotating shaft to pass, the second fixing member is provided with a second hole for the first rotating shaft to pass, the third fixing member is provided with a third hole for the second rotating shaft to pass, and the fourth fixing member is provided with a fourth hole for the second rotating shaft to pass.

5. The flexible display panel of claim 1, wherein the first recessed region is provided with a third slide groove, the second recessed region is provided with a fourth slide groove, an end of the first connecting member is slidably received in the third slide groove, and an end of the second connecting member is slidably received in the fourth slide groove.

6. The flexible display panel of claim 5, wherein the third slide groove is positioned between the first slider and the second slider, and the fourth slide groove is positioned between the third slider and the fourth slider;
    an end of the first connecting member comprises a first slide rail corresponding to the third slide groove, the first connecting member is slidably connected to the first supporting portion through the first slide rail, an end of the second connecting member comprises a second slide rail corresponding to the fourth slide groove, and the second connecting member is slidably connected to the second supporting portion through the second slide rail.

7. The flexible display panel of claim 5, wherein the hinge further comprises a positioning mechanism, the first recessed region and the second recessed region abutting to form a second receiving groove for receiving the positioning mechanism.

8. The flexible display panel of claim 7, wherein the positioning mechanism comprises a first positioning member and a second positioning member, the second receiving groove comprises a first receiving sub-groove and a second receiving sub-groove on opposite sides of the first receiving groove, the first positioning member is positioned in the first receiving sub-groove, and the second positioning member is positioned in the second receiving sub-groove.

9. The flexible display panel of claim 8, wherein the first positioning member is positioned between the first fixing bracket and the rotating mechanism, and the second positioning member is positioned between the second fixing bracket and the rotating mechanism;
  wherein the first positioning member and the second positioning member are sleeved on the first rotating shaft and second rotating shaft; the first positioning member comprises a first protrusion toward the first fixing member, and a second protrusion toward the third fixing member; the second positioning member comprises a third protrusion toward the second fixing member, and a fourth protrusion toward the fourth fixing member; the first fixing member is provided with a first groove; the second fixing member is provided with a second groove; the third fixing member is provided with a third groove, and the fourth fixing member is provided with a fourth groove;
  when the hinge is folded from the unfolded state to the fully folded state, the first protrusion is received in the first groove, the second protrusion is received in the third groove, the third protrusion is received in the second groove, and the fourth protrusion is received in the fourth groove.

10. The flexible display panel of claim 9, wherein the positioning mechanism further comprises a first elastic member, a second elastic member, a third elastic member, and a fourth elastic member;
  the first elastic member and the second elastic member are positioned between the first fixing bracket and the first positioning member, and the third elastic member and the fourth elastic member are positioned between the second fixing bracket and the second positioning member;
  the first elastic member and the third elastic member are sleeved on the first rotating shaft, an end of the first elastic member is connected to the first positioning member, another end of the first elastic member is connected to the first fixing bracket, an end of the third elastic member is connected to the second positioning member, and another end of the third elastic member is connected to the second fixing bracket;
  the second elastic member and the fourth elastic member are sleeved on the second rotating shaft, an end of the second elastic member is connected to the first positioning member, another end of the second elastic member is connected to the first fixing bracket, an end of the fourth elastic member is connected to the second positioning member, and another end of the fourth elastic member is connected to the second fixing bracket;
  when the hinge is folded from the unfolded state to the fully folded state, the first elastic member, the second elastic member, the third elastic member, and the fourth elastic member are in an elastically deformed state.

11. The flexible display panel of claim 10, wherein the hinge further comprises a first bracket between the second positioning member and the rotating mechanism, the first bracket is sleeved on the first rotating shaft and second rotating shaft, the first bracket is provided with a first recess and a second recess, the second fixing member is rotatably received in the first recess, and the fourth fixing member is rotatably received in the second recess;
  the first fixing bracket comprises a first fixing bracket body, a second bracket extending from an end of the first fixing bracket body, and a connecting portion connecting between the first fixing bracket body and the second bracket, the second bracket is sleeved on the first rotating shaft and the second rotating shaft, the second bracket is provided with a third recess and a fourth recess, the connecting portion is provided with a fixing groove, the first fixing member is rotatably received in the third recess, the third fixing member is rotatably received in the fourth recess, and the first positioning member is positioned between the second bracket and the first fixing bracket body and is mounted in the fixing groove.

12. The flexible display panel of claim 11, wherein the hinge further comprises a synchronization mechanism positioned within the first receiving groove, and the synchronization mechanism comprises a first synchronizing member, a second synchronizing member, and a third synchronizing member;
  wherein the first synchronizing member is connected to the first rotating shaft, the second synchronizing member is connected to the second rotating shaft, and the first synchronizing member is synchronously connected to the second synchronizing member through the third synchronizing member to synchronously rotate the first rotating shaft and the second rotating shaft.

13. The flexible display panel of claim 12, wherein the first synchronizing member comprises a first gear, the second synchronizing member comprises a second gear, and the third synchronizing member comprises two third gears meshing with each other;
  wherein the two third gears are rotatably connected to the first bracket and the second bracket, the first gear is sleeved on the first rotating shaft, the second gear is sleeved on the second rotating shaft, the first gear is meshed with one of the two third gears, and the second gear is meshed with the other one of the two third gears.

14. An electronic device, comprising a flexible display panel, wherein the flexible display panel comprises a housing, a hinge received in the housing, and a flexible display panel body disposed in the housing and positioned on a side of the housing and the hinge, the flexible display panel body comprises a flexible portion corresponding to the hinge, and the hinge comprises:
  a fixing bracket comprising a first fixing bracket and a second fixing bracket at opposite ends of the hinge;
  a supporting mechanism comprising a first supporting portion rotatably connected to a side of the fixing bracket along a first axis, and a second supporting portion rotatably connected to another side of the fixing bracket along a second axis;
  a rotating mechanism disposed between the first fixing bracket and the second fixing bracket, and comprising a first rotating shaft and a second rotating shaft rotatably connected to the fixing bracket, a first connecting member fixedly connected to the first rotating shaft, and a second connecting member fixedly connected to the second rotating shaft; and
  wherein an end of the first connecting member comprises a first fixing member and a second fixing member, the first fixing member and the second fixing member are fixedly connected to the first rotating shaft, another end of the first connecting member is slidably connected to the first supporting portion, an end of the second connecting member comprises a third fixing member and a fourth fixing member, the third fixing member and the fourth fixing member are fixedly connected to the second rotating shaft, and another end of the second connecting member is slidably connected to the second supporting portion;

wherein the first supporting portion comprises a first recessed region, the second supporting portion comprises a second recessed region, the first recessed region and the second recessed region are disposed opposite to each other, the first recessed region and the second recessed region are butted to form a first receiving groove for receiving the first connecting member and the second connecting member, and the first receiving groove is corresponding to an intermediate region of the supporting mechanism.

15. The electronic device of claim 14, wherein the first fixing bracket comprises a first slide groove, the second fixing bracket comprises a second slide groove, the first supporting portion comprises a first slider and a second slider, and the second supporting portion comprises a third slider and a fourth slider;

when the hinge is folded from an unfolded state to a fully folded state, the first slider rotates in the first slide groove along the first axis, the second slider rotates in the second slide groove along the first axis, the third slider rotates in the first slide groove along the second axis, and the fourth slider rotates in the second slide groove along the second axis.

16. The electronic device of claim 14, wherein the first recessed region is provided with a third slide groove, the second recessed region is provided with a fourth slide groove, an end of the first connecting member is slidably received in the third slide groove, and an end of the second connecting member is slidably received in the fourth slide groove.

17. The electronic device of claim 16, wherein the third slide groove is positioned between the first slider and the second slider, and the fourth slide groove is positioned between the third slider and the fourth slider;

an end of the first connecting member comprises a first slide rail corresponding to the third slide groove, the first connecting member is slidably connected to the first supporting portion through the first slide rail, an end of the second connecting member comprises a second slide rail corresponding to the fourth slide groove, and the second connecting member is slidably connected to the second supporting portion through the second slide rail.

18. The electronic device of claim 16, wherein the hinge further comprises a positioning mechanism, the first recessed region and the second recessed region abutting to form a second receiving groove for receiving the positioning mechanism.

* * * * *